Aug. 27, 1935.  C. R. ALDEN  2,012,677
SPINDLE STRUCTURE
Filed Aug. 31, 1931
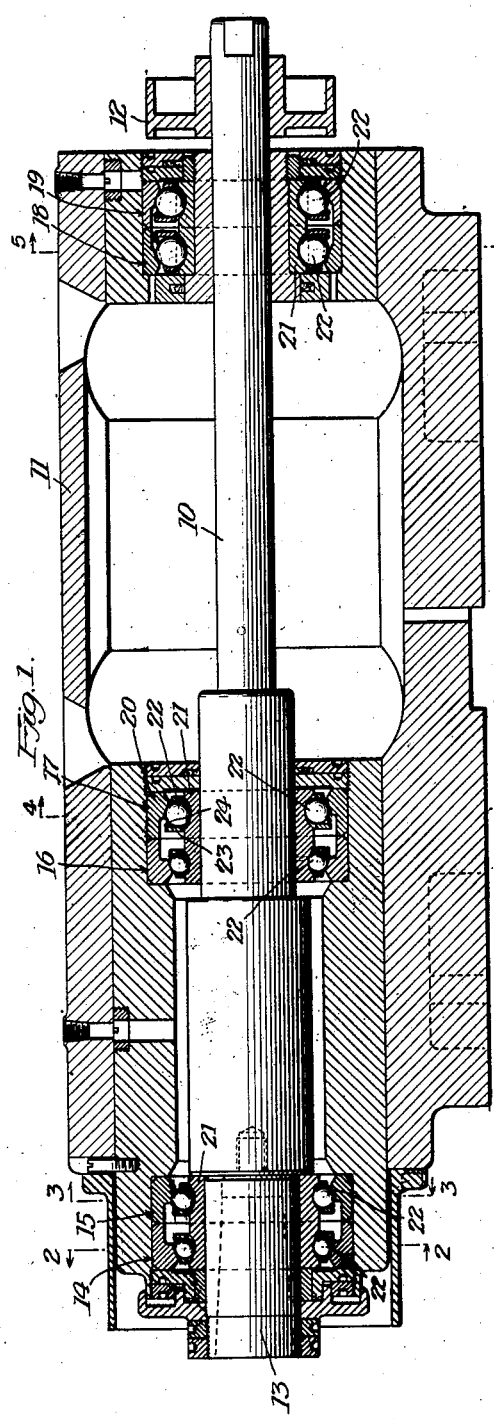
Inventor
Carroll R. Alden
By Chindahl, Parker & Carlson
Attys.

Patented Aug. 27, 1935

2,012,677

UNITED STATES PATENT OFFICE 2,012,677

SPINDLE STRUCTURE

Carroll R. Alden, Detroit, Mich., assignor to Ex-Cell-O Aircraft & Tool Corporation, Detroit, Mich., a corporation of Michigan Application August 31, 1931, Serial No. 560,280

12 Claims. (Cl. 308—189)

The invention relates to spindle structures, and more particularly to the construction of spindles especially adapted for use in connection with machine operations, such as grinding or boring, wherein exceptional accuracy is essential.

An object of the invention is to provide a spindle structure embodying new and improved means for eliminating or at least holding to an absolute minimum the radial play of a rotating spindle and the bearings by which the spindle is supported.

Another object of the invention is to provide, in connection with a rotatable spindle, novel means for eliminating what may be termed a cyclic or periodic variation in the travel of a spindle from its true axis of rotation.

Other objects and advantages will become apparent from the following description and in the accompanying drawing, in which:

Figure 1 is an axial section through a spindle construction embodying the features of the invention.

Figs. 2, 3, 4, and 5 are transverse sections through the bearings respectively as indicated by the lines 2—2, 3—3, 4—4, and 5—5 in Fig. 1.

At the outset, it will be well to state that the present invention deals with the correction and elimination of exceedingly small variations and irregularities occurring in the rotation of a spindle, which variations are so minute as to almost defy of quantitative measurement. Throughout the disclosure of the invention, it will be considered that the spindle structure is used in connection with boring tools, such as diamond or tungsten carbide tools which are not only exceedingly hard but are also exceedingly brittle. In using such tools, the spindle by which they are rotated must be held to an absolute minimum of radial play in order, first to produce bores which are accurate and, secondly, to prevent injury to the tools.

Heretofore, bearings of the friction type have been employed in spindle structures of this nature but such bearings are subject to objection in that they must be finished with extreme precision which is quickly lost through wear. Moreover, more power is required to drive spindles mounted in bearings of this type than is required to drive bearings of the roller element type. This latter type of bearing, when finished with extreme accuracy, functions as satisfactorily as plain friction bearings and is generally better, since it requires less power for operation and is substantially unaffected by wear. However, roller element type bearings which, for illustration, are shown herein as ball bearings, produce what appears to be a cyclic or periodic variation in the travel of the spindle from its true axis of rotation. This variation generally appears in a bore formed by a tool carried by the spindle in the nature of a spiral track or tracks. These variations are so infinitesimal that they become apparent in the work only after a plug gauge of the same diameter as the bore has been driven through the bore, whereby to burnish the high spots therein. Theoretically, the spiral track is at least partially the result of minute distortions of the outer races of the bearings by which the shape of the race between the points thereon, contacted by the balls, becomes chordal instead of being truly arcuate on the radius of the ball circle. Another factor tending to produce the spiral track is the slight radial movement or vibration in the spindle which results from the very slight and almost imperceptible looseness between the balls and races necessary for proper operation at high speeds and particularly to prevent heating up due to friction. With a radial thrust applied to the spindle in one direction, the balls will move successively across the line of thrust. As each ball passes across the line of thrust, a slight radial movement of the spindle will result. The number of these radial movements and consequently the number of high spots formed on the work per revolution of the spindle, will depend upon the diameter of the races and the diameter of the balls. The appearance of these high spots is disadvantageous in that it leads an observer to believe that the bore is not as accurate as one in which the tracks do not appear, although this is not generally true.

The present invention eliminates the formation and appearance of these spiral tracks by varying the number or the size, or the number and size of the roller elements in certain of the supporting bearings. That is to say, by way of example, a spindle is journaled in a number of longitudinally spaced ball bearings, which bearings instead of being similar, according to prevalent practice, have balls therein of different numbers and sizes. This arrangement has been found to substantially eliminate all radial play in the bearings and in the spindle, and it is presumed that this is due to the corrective effect of the bearings upon the lateral movement or distortion occurring in any one bearing. In addition to the different numbers of balls in the various bearings, I have found that spacing the bearings in pairs along the spindle and altering the spindle diameter between the successive pairs of bearings contributes to a decidedly improved finish when the spindle is used for boring holes.

In the drawing, a particular structure is shown merely for the purpose of illustrating the invention. Therein, 10 designates a spindle enclosed by a suitable supporting housing 11. The spindle is driven at one end in any conventional manner, as by a pulley 12 which is driven from a source of power (not shown), and the other end of the spindle is arranged, as at 13, to receive and support one end of the tool. Interposed between the housing and the spindle are a number of ball bearings which are spaced longitudinally of the spindle and support the spindle for rotation. Six bearings are herein shown and are designated 14, 15, 16, 17, 18, and 19. Preferably the bearings are arranged in pairs; one pair 14, 15 being at the tool receiving end of the spindle; a second pair 18, 19 being at the driven end, while the third pair 16, 17 is intermediately disposed. In bearings 14, 15, 16, and 17 it is preferred that the roller elements move through orbits of substantially equal dimensions.

In general structure the bearings are similar and, in this instance, each comprises an outer race 20 secured to the housing, an inner race 21 secured to the spindle, and an intermediate series of balls 22. The balls are supported in spaced relation in sockets provided in a retainer ring 23 and are held therein by such means as an annular spring member 24.

With reference to Figs. 2 to 5, inclusive, it will be seen that the balls, in certain of the bearings, differ in size and number from the balls in other bearings. As a specific example, the bearings of the illustrated device are arranged as follows: The outer bearing 14 at the tool receiving end or nose of the spindle contains twenty-two balls, and the next adjacent bearing 15 completing that pair has twenty-one balls. The first bearing 16 of the intermediate pair of bearings contains twenty-two balls (being similar to the bearing 14), while the other bearing 17 contains nineteen balls. The pair of bearings 18 and 19, may be similar and in this instance both bearings contain fourteen balls. In the bearings, wherein the number of balls differ, it will be noted that the size of the balls in one bearing differs from the size of the balls in another bearing yet the dimensions of the orbits are substantially equal.

Preferably, the spindle 10 is formed with a plurality of axial sections increasing progressively in diameter toward the tool end. Thus, the diameter of the spindle 10 between the pairs of bearings 14, 15 and 16, 17 is greater than that between the pairs of bearings 16, 17 and 18, 19. This difference in diameter of the spindle 10 and the spacing of the pairs of bearings 14, 15 and 16, 17 along the spindle tend to break up the natural period of vibration of the spindle, and to eliminate the synchronization of the natural period of vibration as set up by the number of balls in the bearings and the natural vibration of the spindle.

The primary objective is to obtain a true running spindle for precision work, and in general is accomplished by counteracting or smoothing out any minute vibration that may tend to occur, and by substantially eliminating vibration in the spindle itself. From the foregoing, it will be evident that a number of factors contributed toward this result. These factors, briefly summarized, consist in providing different numbers of balls in the respective bearings of a pair, in varying the combination of the numbers of balls in one pair of bearings to that in another pair of bearings, and in providing a third pair of bearings and varying the diameter of the spindle between the respective pairs of bearings and the spacing of the pairs of bearings along the spindle. By reason of the differences in number and/or size of the balls in the respective adjacent bearings of a pair, any lateral movement of the spindle tending to occur in one bearing due to vibration or infinitesimal distortion, will be counteracted by the other adjacent bearing. In consequence, movement of the spindle is confined to its true axis of rotation, spiral trackways in a bore produced in a piece of work by tools carried by the spindle are eliminated, and the appearance of the bore after burnishing with the plug gauge is perfectly true and smooth.

I claim as my invention:

1. In a device of the character described, the combination of a spindle, two pairs of adjacent bearings disposed longitudinally of said spindle adjacent the tool engaging end thereof, each of said bearings having balls therein as antifriction elements and being fashioned so that the size of balls in one bearing differs from the size of balls in the next adjoining bearing.

2. In combination with a spindle, a number of roller element bearings in rotative support thereof, said bearings each having substantially equal orbits of movement but being differently dimensioned to counteract minor irregularities occurring in each other.

3. In a device of the character described, the combination of a spindle and bearings for supporting said spindle, said bearings being of the roller element type and arranged longitudinally of said spindle in pairs of adjacent bearings, one bearing in each of certain pairs having a different number of roller elements than the number of said elements contained in the other bearing of the respective pair, and the combination of the numbers of roller elements in the respective bearings of each of said certain pairs being different than the combination of roller elements in another of said certain pairs of bearings.

4. In a device of the character described, the combination of a spindle, two axially spaced pairs of adjacent bearings of the roller element type for supporting said spindle, the number of roller elements in the respective bearings of each pair being different, the combination of the number of roller elements in the respective bearings of each pair being different than that in the other pair, and a third pair of adjacent bearings of the roller element type for supporting said spindle and axially spaced from said first mentioned pairs of bearings.

5. In a device of the character described, the combination of a spindle, two axially spaced pairs of adjacent bearings of the roller element type for supporting said spindle, the number of roller elements in the respective bearings of each pair being different, the combination of the number of roller elements in the respective bearings of each pair being different than that in the other pair, and a third bearing of the roller element type for supporting said spindle and axially spaced from said first mentioned pairs of bearings, the diameter of said spindle between said pairs of bearings being greater than that between said third bearing and said pairs of bearings, and the length of said spindle between said pairs of bearings being less than that between said third bearing and said pairs of bearings.

6. In a device of the character described, the combination of a spindle and bearings for supporting said spindle, said bearings being of the roller element type and arranged longitudinally of said spindle in pairs of adjacent bearings, certain of said pairs of bearings being adjacent the ends of the spindle and another pair of bearings being intermediate and substantially spaced from the ends of the spindle, the combination of roller elements contained in the end pairs of the bearings being different at each end, and the intermediate pair of bearings having a different combination of roller elements from either of the end pairs of bearings.

7. In a device of the character described, the combination of a spindle and bearings for rotatably supporting said spindle, said bearings being of the roller element type and arranged in substantially spaced relationship longitudinally of said spindle, certain of said bearings being adjacent the ends of the spindle and other of said bearings being intermediate and substantially spaced from the ends of the spindle, the roller elements in the bearings at the respective ends of the spindle being of substantially different diameters, and the roller elements of an intermediate bearing being of substantially different diameter than the roller elements of the bearings at either end of the spindle.

8. In a device of the character described, the combination of a spindle and bearings for supporting said spindle, said bearings being of the roller element type and arranged in spaced relationship longitudinally of said spindle, said spindle being formed with sections of progressively increasing diameter from one end to adjacent its opposite end, said bearings being positioned to support said spindle adacent its ends and at an intermediate point substantially spaced from said ends, the roller elements of the end bearings being respectively of different sizes and number, and the roller elements of the intermediately positioned bearing being of different sizes and number from the roller elements in either of the end bearings.

9. In a device of the character described, the combination of a spindle and bearings for supporting said spindle, said bearings being of the roller element type and arranged longitudinally of said spindle in pairs, certain of said pairs of bearings being adjacent the ends of the spindle and another pair of bearings being intermediate and substantially spaced from said end bearings, one bearing of one of the end pairs of bearings and one intermediate bearing having the same number of roller elements and the other bearing of said one end pair of bearings and the other intermediate bearing having respectively different numbers of roller elements which also differ in number from the elements in said one bearing and in the first mentioned intermediate bearing, and the pair of bearings at the other end of the spindle having a different number of roller elements from either of the other pairs of bearings.

10. In a device of the character described, the combination of a spindle and bearings for rotatably supporting said spindle, said bearings being of the roller element type and arranged longitudinally of said spindle in pairs, one pair of said bearings supporting the spindle adjacent one end and another pair of bearings supporting said spindle at a part intermediate and substantially spaced from its ends, the roller elements of the pair of bearings at said one end of the spindle differing in number in each bearing of the pair, the roller elements of each bearing of the intermediate pair of bearings differing in number in each bearing of the pair, and the roller elements in one of the bearings of each of said pairs of bearings differing in number from the roller elements of either of the bearings of the other pair of bearings.

11. In a high speed tool spindle structure, a spindle having a plurality of sections progressively increasing in diameter from one end of the spindle to adjacent the other end of the spindle, bearings of the roller element type rotatably supporting said spindle, adjacent each end and at an intermediate section of the spindle, said bearings all having substantially equal orbits, the roller elements in the end bearings differing in size and number, and roller elements of the intermediate bearing differing in size and number from the roller elements of either of said end bearings.

12. In a high speed tool spindle structure, a spindle having an operative end section and having a plurality of sections including an intermediate section increasing progressively in diameter respectively from one end of said spindle to said end section, said end section being less in diameter than the next adjacent section, a plurality of bearings of the roller element type rotatably supporting said spindle, two of said bearings being mounted respectively on said one end of said spindle and on said end section, and another of said bearings being mounted on said intermediate section, said bearings all having substantially equal orbits, the roller elements in the end bearings differing in size and number, and the roller elements in the intermediate bearing differing in size and number from the roller elements of either of said end bearings.

CARROLL R. ALDEN.